A. E. BERGEY.
MECHANISM FOR DRIVING TOOLS.
APPLICATION FILED FEB. 18, 1919.
1,357,376.
Patented Nov. 2, 1920.
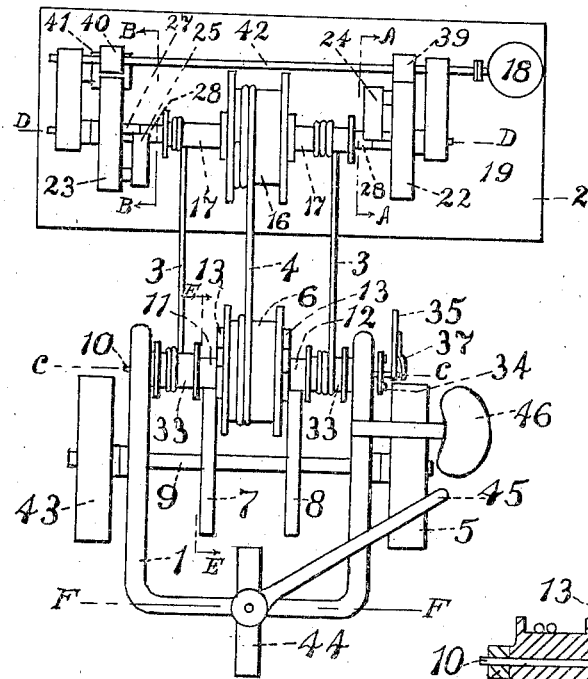
Fig. 1.
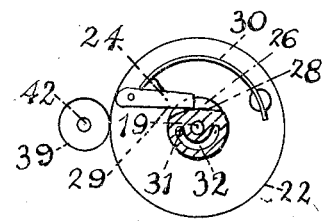
Fig. 2.
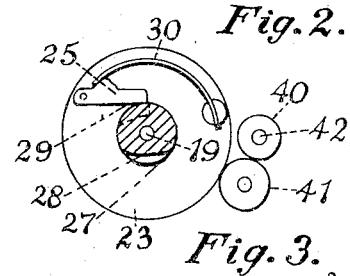
Fig. 3.
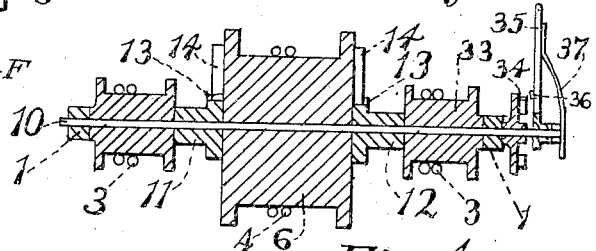
Fig. 4.
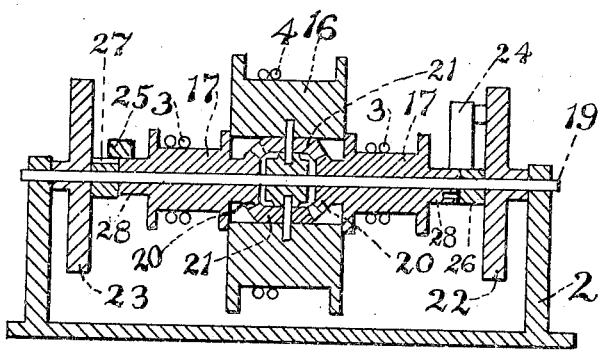
Fig. 5.
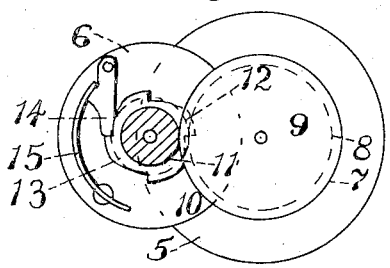
Fig. 6.
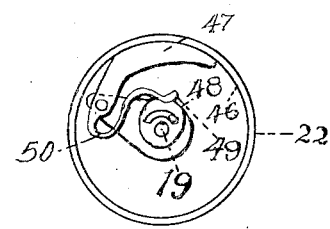
Fig. 7.
Witnesses.
Malinda Bergey
Florence Bergey
Fig. 8.
Inventor.
Aaron E. Bergey

UNITED STATES PATENT OFFICE.

AARON E. BERGEY, OF BAZETTA TOWNSHIP, TRUMBULL COUNTY, OHIO.

MECHANISM FOR DRIVING TOOLS.

1,357,376.  Specification of Letters Patent.  Patented Nov. 2, 1920.

Application filed February 18, 1919. Serial No. 277,859.

*To all whom it may concern:*

Be it known that I, AARON E. BERGEY, a citizen of the United States, residing in Bazetta township, in the county of Trumbull and State of Ohio, have invented a new and useful Mechanism for Driving Tools, of which the following is a specification.

My invention relates to mechanisms for driving tools in which power is supplied to the tool by means of a rope or chain. It is intended chiefly for use in driving agricultural implements, though it may be used for other purposes. The object of my invention is to provide a mechanism that is efficient and economical, and that can be used for driving a great variety of tools.

I attain this object by the mechanism illustrated in the accompanying drawings, in which—

Figure 1 is a plan, Fig. 2 is a section on the line AA, Fig. 3 is a section on the line BB, Fig. 4 is a section on the line CC, Fig. 5 is a section on the line DD, Fig. 6 is a section on the line EE, Fig. 7 is a section on the line FF, and Fig. 8 is a sectional view showing a friction clutch drive.

Similar characters refer to similar parts throughout the several views.

1 is the tool frame. It is constructed so that various tools, such as harrows, plows, and the like, may be attached thereto.

2 is the main frame. On it is mounted the main portion of the driving mechanism. It is constructed so that various tools may be attached thereto.

3 are two driving-in ropes. Their inner ends are attached to a reeling-in mechanism mounted on the frame 2. The reeling-in mechanism consists of two spools connected by a balancing gear which is constructed so that when one of the spools turns in one direction with reference to the balancing gear, the other spool is forced to turn in the opposite direction. The outer ends of the ropes 3 are connected to a balancing gear on the frame 1. This balancing gear is constructed so that when one of the ropes 3 moves forwardly with reference to the frame 1, the other of the ropes is forced to move backwardly. The drawings show two spools revolving in unison, the ropes 3 being wound thereon in opposite directions.

4 is the driving-out rope. It is connected to the driving out reeling mechanism on the frame 2 and to the tool frame reeling mechanism on the frame 1, the parts being arranged so that when the rope 4 reels in on one of the reeling mechanisms it reels out from the other.

5 is the traction mechanism. It is mounted on the frame 1 and is adapted to exert tractive effort on the ground. It may be of any suitable variety, such as, for example, an endless track, or a traction wheel. The latter is shown in the drawings.

The traction mechanism and the tool frame reeling mechanism are connected so as to run in unison, as are also the driving-in reeling mechanism and the driving-out reeling mechanism. It is convenient to call the traction mechanism 5, and the ropes 3 and 4, together with the connecting gearing, the main driving gear.

The arrangement of parts is made such that when the main driving gear is running forwardly, the driving-in ropes 3 are reeled in on the main frame 2, the frame 1 is driven in toward the frame 2, the traction mechanism 5 is driven through contact with the ground thus driving the tool frame reeling mechanism, the tool frame reeling mechanism reels the driving-out rope 4 in on the frame 1 and out from the frame 2, where the rope 4, through the driving-out reeling mechanism and the driving-in reeling mechanism, helps to drive the ropes 3. The amount of power thus returned by the rope 4 to the ropes 3, depends on the speed and tension of the ropes. Power that is not used by the tools or by friction, is thus returned. When the main driving gear is running backwardly, the driving-out rope 4 is reeled in on the frame 2 and out from the frame 1, thus driving the traction mechanism 5 so as to drive the tool frame 1 away from the frame 2 and reeling the ropes 3 out from the frame 2, where ropes 3, through the two reeling mechanisms on the frame 2, help to drive the rope 4. The power thus returned by the ropes 3 to the rope 4 is that which is not used by the tools or by friction.

It is very desirable that the ropes 3 and 4 always remain taut. For they will thus be kept off the ground. They will also respond quickly to the control mechanism to be described later.

I provide mechanism for maintaining the ropes taut both when running forwardly and when running backwardly. I prefer to use a slip-drive gear. This consists of two driving members in the main driving gear, which are forced, when driving, to slip somewhat at their point of mutual drive, and which are so proportioned that there is considerable resistance to slipping. The slip-drive gear may be located at any suitable point in the main driving gear, but I prefer to have the slipping take place at the point of contact between the traction mechanism and the ground, since some slipping will take place there in any case.

6 is the tool frame reeling mechanism. It may be of any suitable type. I have shown a spool mounted on the frame 1. It is connected, by means of suitable gearing, to run in unison with the traction mechanism at one relative speed when running forwardly, and at another relative speed when running backwardly.

7 and 8 are gear wheels revolving with the wheel 5.

9 is the shaft to which the members 5, 7, and 8 are attached. It is revolubly mounted on the frame 1.

10 is a shaft on which the spool 6 is revolubly mounted. It is revolubly mounted on the frame 1.

11 and 12 are pinions revolubly mounted on the shaft 10. They are adapted to drive, and be driven by, the gear wheels 7 and 8, respectively. The gear wheels 7 and 8, and the pinions 11 and 12 thus run in unison. The gear ratio of the pinion 12 to the gear wheel 8 is somewhat greater than that of the pinion 11 to the gear wheel 7. Hence the pinion 11 revolves faster than the pinion 12. The pinions 11 and 12 are each connected with the spool 6 by a pawl-and-ratchet drive gear such that when the main driving gear is running forwardly, the traction mechanism 5 will drive the spool 6 through the members 11 and 7, the spool 6 revolving faster than the pinion 12; and when the main driving gear is running backwardly, the reeling mechanism 6 will drive the traction mechanism 5 through the members 8 and 12, the pinion 11 now revolving faster than the spool 6.

The proportion of parts is made such that when the main driving gear is running forwardly, the ropes 3 will tend to drive the traction mechanism 5 at a speed somewhat greater than is allowed by the rope 4; and that when the main driving gear is running backwardly, the rope 4 will tend to drive the tool frame 1, through the members 12, 8, 5, and the ground, at a speed somewhat greater than is allowed by the ropes 3. In both cases the traction mechanism must slip somewhat on the ground. Thus the ropes 3 and 4 always remain taut.

13 are two ratchet wheels attached to the pinions 11 and 12, one for each.

14 are two pawls attached to the spool 6. They are adapted to drive, and be driven by, the ratchet wheels 13, one for each.

15 are springs that serve to keep the members 13 and 14 in engagement, when driving.

16 is the driving-out reeling mechanism. It is mounted on the main frame 2, and is adapted to reel the rope 4 in on, and out from, the frame 2. It is made in the form of a spool, as shown in the drawings.

17 is the driving-in reeling mechanism. It is made in the form of two spools adapted to reel the ropes 3 in on, and out from, the frame 2.

18 is a motor. It is mounted on the frame 2 and is adapted to drive the main driving gear. It may be of any suitable type. In case the frame 2 is mounted on a self propelling vehicle, such as an automobile, farm tractor, &c., the motor 18 may be the motor of the self propelling vehicle.

19 is the main spool shaft. It is revolubly mounted on the frame 2. On it are mounted the spools 17.

The members 16 and 17 are connected by suitable gearing to run (normally) in unison. I have shown in the drawings what I consider the best form of gearing for this purpose.

20 are two bevel gear wheels attached to and revolving with the spools 17.

21 are two gear wheels meshing with the wheels 20 and revolving on pins in the spool 16.

The spool 16 is attached to the shaft 19, with which it revolves. It will be seen that when one of the spools 17 revolves in one direction on the shaft 19, the other of the spools 17 is forced to revolve in the opposite direction.

22 and 23 are two gear wheels revolubly mounted on the shaft 19 and driven, through suitable gearing, by the motor 18, to revolve in opposite directions.

The shaft 19 is connected with the members 22 and 23 by means of suitable clutches so that it can be driven at will in either direction. The clutches may be either friction clutches or positive clutches. I shall first describe a positive clutch.

24 and 25 are two clutch members attached to and revolving with the wheels 22 and 23, respectively.

26 and 27 are two clutch members attached to and revolving with the shaft 19. They are adapted to engage with the members 24 and 25, respectively.

28 are two cams attached to and revolving with the spools 17, one for each.

29 are two tappets attached to the members 24 and 25, one to each.

30 are two springs adapted to cause the dogs 24 and 25 to engage the teeth 26 and 27, respectively, unless prevented by the cams 28 and tappets 29.

31 is a pin attached to the member 26.

32 is a slot or pocket formed in one of the cams 28 and adapted to receive the pin 31. The parts are constructed so that the travel of the spools 17 on the shaft 19 is limited, thus preventing the cams 28 from turning too far.

When the cams 28 have the position shown in Figs. 2 and 3, the clutch 24, 26 is engaged, the clutch 25, 27 is disengaged, and the main driving gear runs forwardly. If the spools 17 are now moved out of unison with the shaft 19 to the other end of the spool travel, the clutch 25, 27 will be engaged, the clutch 24, 26 will be disengaged, and the main driving gear will run backwardly. For an intermediate position of the spools 17 on the shaft 19, both clutches will be disengaged, and the main driving gear will be stationary.

In order that the operator may readily control the clutches from the frame 1, I provide mechanism as follows,—

33 are two spools on which the outer ends of the ropes 3 are wound in opposite directions. They are attached to and revolve with the shaft 10.

34 is a toothed wheel attached to the shaft 10.

35 is a lever revolubly mounted on the shaft 10.

36 is a dog or pawl attached to the lever 35 and adapted to engage the teeth of the wheel 34.

37 is a spring adapted to keep the dog 36 normally out of engagement with the teeth of the wheel 34.

The lever can slide longitudinally, as well as turn, on the shaft 10. By pushing the lever 35 to the left, the operator can overcome the action of the spring 37 and thus cause the dog 36 to engage with the teeth of the wheel 34. He is then enabled to turn the shaft 10 and spools 33, thus causing the ropes 3 to have relative motion and to turn the spools out of unison with the shaft 19, as previously described. It will be seen that the clutches 24, 26 and 25, 27 can readily be engaged and disengaged by the operator without leaving the frame 1, both when the latter is at rest and when it is in motion. It will be seen that the shaft 10 is normally free to revolve such a small amount as is necessary for adjustment of the ropes 3 due to reeling out (or in, as the case may be) at slightly unequal speeds.

I shall now describe the friction clutch, and its operation.

46 is a clutch member revolving with the member 22. It is shown in the form of an inside braking surface.

47 is a clutch member revolving with the shaft 19. It is shown in the form of a brake shoe which can rock back and forth on a suitable pin attached to the shaft 19.

48 is a cam attached to the spool 17.

49 is a tappet attached to the member 47 and adapted to coöperate with the cam 48.

50 is a spring through which pressure is transmitted from the cam-and-tappet mechanism 48, 49 to the clutch 46, 47. Thus excessive clutch pressure is prevented.

The clutch 46, 47 is a forwardly driving clutch.

The member 23 and the shaft 19 are connected by a backwardly driving clutch constructed in a similar manner.

The arrangement of parts is made such that at one end of spool travel (of the spools 17 on the shaft 19) the forwardly driving clutch is engaged and the backwardly driving clutch is disengaged; at the other end of spool travel, the backwardly driving clutch is engaged and the forwardly driving clutch is disengaged; while for intermediate positions of spool travel, both clutches are disengaged.

The friction clutches are operated in a manner similar to that previously described.

39 is a pinion meshing with the gear wheel 22, which it drives in a forward direction.

40 is a pinion revolving with the pinion 39, being attached to the same shaft.

41 is a gear wheel meshing with the pinion 40 and also with the gear wheel 23. It therefore drives the wheel 23 backwardly.

42 is the shaft to which the pinions 39 and 40 are attached. It is driven by the motor 18.

It will be seen that the clutches are controlled through the two driving-in ropes 3. It is obvious that the driving-out rope may be made double and the driving-in rope single, and that control may be had through the two driving-out ropes, balancing gears being provided at both ends. But the balancing gear at the tool frame would evidently be more complex, since the driving-out ropes would have to reel in or out at the frame 1, while the driving-in ropes are normally stationary at the frame 1. Hence the arrangement shown and described is much better.

43 is a supporting wheel for the frame 1. It is shown revolubly mounted on the shaft 9.

44 is a supporting and steering wheel for the frame 1. It is mounted in a spindle in the frame 1.

45 is a steering handle. It is attached to the spindle of the wheel 44, which latter can thus be turned at will by the operator.

46 is a seat for the operator. It is placed so that the control levers are accessible.

I claim:

1. In a mechanism for driving tools, a main frame, two reeling mechanisms mounted on said main frame, a balancing gear connecting said two reeling mechanisms and constructed so that when one of the said reeling mechanisms turns in one direction with reference to the said balancing gear the other of the said reeling mechanisms turns in the opposite direction, a driving mechanism adapted to drive the said reeling mechanisms, and a control mechanism, said control mechanism being constructed so that when the said two reeling mechanisms are turned relatively to each other in one direction the said driving mechanism will be disconnected from the said reeling mechanisms and when the said reeling mechanisms are turned relatively to each other in the other direction the said driving mechanism will be connected so as to drive the said reeling mechanisms, substantially as described.

2. In a mechanism for driving tools, a main frame, two reeling mechanisms mounted on said main frame, a balancing gear connecting said two reeling mechanisms and constructed so that when one of the said reeling mechanisms turns in one direction with reference to the said balancing gear the other of the said reeling mechanisms turns in the opposite direction, a forwardly driving mechanism adapted to drive the said reeling mechanisms forwardly, a backwardly driving mechanism adapted to drive the said reeling mechanisms backwardly, and a control mechanism, said control mechanism being constructed so that when the said two reeling mechanisms are turned relatively to each other in one direction said reeling mechanisms will be driven forwardly and when the said two reeling mechanisms are turned relatively to each other in the other direction said reeling mechanisms will be driven backwardly, substantially as described.

3. In a mechanism for driving tools, a main frame, two reeling mechanisms mounted on said main frame, a balancing gear connecting said two reeling mechanisms and constructed so that when one of the said two reeling mechanisms turns in one direction with reference to the said balancing gear the other of the said two reeling mechanisms turns in the opposite direction, a third reeling mechanisms adapted to run in unison with the said balancing gear, a forwardly driving mechanism adapted to drive the three said reeling mechanisms forwardly, a backwardly driving mechanism adapted to drive the three said reeling mechanisms backwardly, and a control mechanism, said control mechanism being constructed so that when the two first mentioned of the said reeling mechanisms are turned relatively to each other in one direction the said three reeling mechanisms will be driven forwardly and when the two first mentioned of the said reeling mechanisms are turned relatively to each other in the other direction the said three reeling mechanisms will be driven backwardly, substantially as described.

4. In a mechanism for driving tools, a main frame, a tool frame, a traction mechanism mounted on and adapted to drive the said tool frame, a driving-out mechanism adapted to drive the said tool frame away from the said main frame by means of the said traction mechanism, a driving-in mechanism adapted to drive the said tool frame toward the said main frame, and a control mechanism comprising two spools and mechanism constructed so that when the said two spools are turned out of unison in one direction the said tool frame will be driven away from the said main frame and when the said two spools are turned out of unison in the other direction the said tool frame will be driven toward the said main frame, substantially as described.

5. In a mechanism for driving tools, a main frame, a tool frame, a traction mechanism mounted on and adapted to drive the said tool frame, a driving-out mechanism adapted to drive the said tool frame away from the said main frame by means of the said traction mechanism, two driving-in ropes adapted to drive the said tool frame toward the said main frame, two driving-in reeling mechanisms mounted on the said main frame and adapted to drive the said driving-in ropes, a balancing gear connecting the two said driving-in reeling mechanisms and constructed so that when one of the said two driving-in reeling mechanisms turns in one direction with reference to the said balancing gear the other of the said two driving-in reeling mechanisms turns in the opposite direction, and a control mechanism, said control mechanism being constructed so that when the said two driving-in ropes are moved out of unison in one direction the said tool frame will be driven toward the said main frame and when the said two driving-in ropes are moved out of unison in the other direction the said tool frame will be driven away from the said main frame, substantially as described.

6. In a mechanism for driving tools, a main frame, a tool frame, a traction mechanism mounted on and adapted to drive the said tool frame, a driving-out reel-drive mechanism adapted to drive the said tool frame away from the said main frame by means of the said traction mechanism, two driving-in ropes, two driving-in reeling mechanisms adapted to drive the said tool frame toward the said main frame by means of the said driving-in ropes, a balancing gear connecting the two said driving-in reeling mechanisms and constructed so that when one of the said driving-in reeling mechanisms turns in one direction with reference to the said balancing gear the other of the said driving-in reeling mechanisms turns in the opposite direction, and a connecting gear adapted to cause the said driving-out reel-drive mechanism to run in unison both at the main frame and at the tool frame, said connecting gear being constructed to contain a slip-drive gear which is adapted to keep all driving ropes taut both when the said tool frame is being driven toward the said main frame and when it is being driven away from the said main frame, substantially as described.

7. In a mechanism for driving tools, a main frame, a tool frame, a traction mechanism mounted on and adapted to drive the said tool frame, a tool frame reeling mechanism mounted on the said tool frame and adapted to drive the said traction mechanism, a driving-out rope adapted to drive the said tool frame reeling mechanism, a driving-out reeling mechanism mounted on the said main frame and adapted to drive the said driving-out rope, two driving-in ropes adapted to drive the said tool frame, two driving-in reeling mechanisms mounted on the said main frame and adapted to drive the said driving-in ropes, a balancing gear connecting the said two driving-in reeling mechanisms, a main frame connecting gear connecting the said driving-out reeling mechanism to run in unison with the said driving-in reeling mechanisms, and a tool frame connecting gear, said tool frame connecting gear being constructed so as to cause the said traction mechanism to slip somewhat on the ground both when the said tool frame is being driven away from the said main frame and when the said tool frame is being driven toward the said main frame, substantially as described.

AARON E. BERGEY.

Witnesses:
MALINDA BERGEY,
FLORENCE BERGEY.